2,825,699
Patented Mar. 4, 1958

2,825,699

REMOVAL OF IRON FROM CLAY CATALYSTS

James E. McEvoy, Morton, and Thomas H. Milliken, Jr., Moylan, Pa., assignors to Houdry Process Corporation, Wilmington, Del., a corporation of Delaware No Drawing. Application July 20, 1954
Serial No. 444,637

15 Claims. (Cl. 252—449)

The present invention relates generally to processes for the treatment of argilloferruginous substances and more particularly to the preparation of solid adsorbents useful as contact catalysts in the conversion of hydrocarbons.

It has heretofore been proposed to employ as contact masses in the catalytic conversion of hydrocarbons certain natural earths and clays. Among the natural adsorptive materials there are some types of clay, including certain subbentonites, which can be activated by known methods, such as acid treatment, to produce catalysts of acceptable quality. Many available clays, however, do not respond to the usual methods of activation to produce catalysts of sufficiently high selectivity and activity level and are regarded as unsuitable for use as cracking or reforming catalysts.

Naturally occurring clays are composed chiefly of hydrosilicates of aluminum, but ordinarily contain besides the principal compounds and complexes of silica and alumina lesser proportions of compounds of iron, calcium, magnesium, and so on. The content of iron as ferric oxide has a critical relation to the capacity of the contact mass for regeneration without loss in catalytic activity and/or selectivity. As indicated in U. S. P. 2,078,945 of Eugene J. Houdry, contact masses suitable for use as catalysts should, for this reason, not contain over 3% of iron oxide. On the other hand, in the use of iron containing contact masses for the conversion of sulfur-containing hydrocarbon stocks, there is always the risk of damaging the efficiency or poisoning the contact masses by reaction of sulfur compounds in the charge stock with the iron present in the contact mass.

Although a large part of the iron compounds occurring in, or as components of many clays is present in such a form that it can be removed therefrom by the conventional activating acid treatment, as usual for instance in the treatment of bentonite-type clays, the products thus obtained still contain iron in the order of about 1.5% or more determined as ferric oxide. Moreover, portions of the desirable aluminum content of the clay may be removed therefrom by acid treatment, particularly by repeated or drastic acid treatments at high temperature, and the physical properties of the treated clays important for their use as catalysts may be impaired by such treatment.

Although it is not desired to be bound by any scientific explanation, there is reason to believe that the less readily removable iron components of clays are present in a different form from that of the more easily extractable iron components, being intimately associated in a complex with silicon or perhaps forming a part of the lattice structure by addition to or as proxy for other principal cations of the pattern. This form of iron component may be broadly designated as "isomorphous," although it is recognized that the clay structure may not necessarily be crystalline and that portions or all of the more tenaciously held iron components may vary in form from that of the principal component of the clay structure.

It has been proposed in U. S. P. 2,466,046; 2,466,047; 2,466,048; 2,466,049; and 2,466,052, all of Hubert A. Shabaker, George Alexander Mills, and Ruth C. Denison, to subject clay masses, either with or without preceding wet treatment with mineral acid, to a treatment with gases or vapors of a type reactive with the iron content of the clay in such a manner as to make the iron, and particularly that portion thereof which is more tenaciously held and is not readily and selectively extracted by the usual acid treatment, easily extractable from the clay, preferably by converting these iron components of the clay into a soluble form, for example into soluble salts, the gas or vapor being selected so as to provide a component capable of chemically combining with iron to form an iron salt of this type. It has been proposed, for instance, in the said patents to make use for this purpose either of chlorine, phosgene, or the like for chlorinating the iron of the clay, or of substances capable of sulfiding this iron, such as hydrogen sulfide, carbon disulfide, sulfur vapors, or the like. The iron components of the clay which are present as silicon complexes or otherwise associated with the lattice structure as in "isomorphous" form, are released by their transformation to reaction products which can be readily removed by mild acid treatment and/or washing, or in some instances by volatilization. The residual mass acquires distinct properties of particular importance when the clay treated in this manner is utilized as a catalyst in hydrocarbon conversion. The clay products obtained show important differences in physical properties compared with those of the untreated clay. For instance, the said products do not materially shrink at calcination temperatures of about 1600° F., withstand higher temperatures than usual clay catalysts without substantial depreciation in catalytic activity, and demonstrate a distinguishing X-ray pattern. They are generally lighter and whiter in color than the clays from which they are prepared, and notable differences in spectrogram are also observed. Catalysts thus prepared obtain not only unexpectedly low initial coke makes on heavy and sulfur stocks, but demonstrate a surprising resistance to aging and deterioration by highly corrosive charge stocks on continued use.

As the iron content of the clay is reduced, the catalyst prepared therefrom is progressively improved in properties. Thus, marked improvement in catalytic properties is obtained generally when the content of iron calculated as $Fe_2O_3$ by weight on clay product (dry basis) is reduced to about 0.4% $Fe_2O_3$, though catalysts of still lower iron content, e. g., such having less than 0.3% $Fe_2O_3$ are preferred, best results being obtained with catalysts having a content of iron compounds corresponding to less than 0.2% $Fe_2O_3$.

While the products thus prepared in the manner described in the above-mentioned U. S. patents to Shabaker et al., give very satisfactory results when employed as catalysts in the conversion of hydrocarbons of any type, also of heavy and sulfur-containing stocks, the process of their preparation could still be improved. The treatment of the clays by chlorine or the like is technically somewhat disadvantageous, particularly with respect to the high temperatures required for the chlorination of the iron contained in the clay. The sulfiding of the iron content by means of hydrogen sulfide, carbon disulfide, or the like, on the other hand, works very satisfactorily in itself. In this case, however, the removal of the iron sulfide formed by leaching the sulfided clay material with aqueous acid for a lengthy time (about 24 hours) followed by repeated washing with water and drying before calcination, is disadvantageous not only with respect to the time required, but it also demands very large, space-requiring apparatus.

It is, therefore, an object of the present invention to improve the process of removing the iron compounds formed by sulfiding or otherwise heat-treating iron-containing clays with an aim to make this removing process more economical.

It is another object of the present invention to remove the iron compounds formed by sulfiding or otherwise heat-treating iron-containing clays by a method which avoids the cumbersome leaching and washing of the material.

And it is a further object of this invention to effect the removal of the iron sulfide or the like formed in the treated clay by chemically transforming these iron compounds into a compound which may easily be removed from the clay by volatilization or evaporation.

Other objects and advantages of the invention appear from the following specification and the annexed claims.

The present invention is based upon the discovery that by treatment of clays, containing iron in the form of certain trivalent iron compounds, with ammonium chloride while heating, ferric chloride is formed; for instance, according to the theoretical equation:

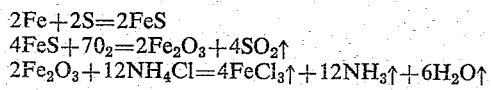

$$2Fe + 2S = 2FeS$$
$$4FeS + 7O_2 = 2Fe_2O_3 + 4SO_2\uparrow$$
$$2Fe_2O_3 + 12NH_4Cl = 4FeCl_3\uparrow + 12NH_3\uparrow + 6H_2O\uparrow$$

The ferric chloride formed can be evaporated together with excess ammonium chloride present and with ammonium hydroxide formed, or their decomposition products.

In accordance with the present invention, therefore, catalytic contact masses are prepared from clay containing iron compounds by sulfiding or otherwise heat-treating said iron compounds in any convenient manner to effect release of the iron from the clay lattice, then treating to convert the iron to ferric oxide form and thereafter treating the resulting clay product with ammonium chloride and heating said clay in the presence of said ammonium chloride to a temperature high enough to effect transformation of the ferric oxide or the like formed before into ferric chloride, but insufficient to effect reduction of the ferric chloride into ferrous chloride under the influence of hydrogen which could otherwise be developed by decomposition of the ammonium group present. On purging the thus treated clay with air, inert gas or vapor at elevated temperature, the ferric chloride is evaporated and removed from the treated clay together with ammonium hydroxide or other ammonium compound formed in the reaction, and with excess ammonium chloride still present. In this operating step, just as in the preceding chloriding step, the temperature employed should be insufficient to effect substantial incipient fusion of the clay.

Instead of sulfiding the clay, it may be treated in other suitable manner to transform the iron of the clay to make it reactive with ammonium chloride upon heating. Thus, with certain iron containing clays, a treatment of the clay, particularly of a clay activated before by acid treatment, by heating in the presence of air to a temperature of 1600–1700° F. may be sufficient to transform the iron thereof in such a manner that ferric chloride will be formed therefrom upon subsequent treatment with ammonium chloride in the proper temperature range.

Any type of iron-containing clay useful for the preparation of hydrocarbon conversion catalysts may be treated in accordance with this invention to remove substantially all or most of the damaging iron. For certain types of clay, for instance those of the montmorillonite group, pretreatment of the clay with acid is advantageous, since otherwise poor porosity of the clay impedes penetration by gaseous or vapor treating agents for transforming the iron in such a manner that iron chloride will be formed on subsequent treatment with ammonium chloride. The increased porosity of the acid treated clay is useful, too, in securing the thorough impregnation or penetration by the ammonium chloride solution or vapor into and through the solid material under treatment.

Generally, with kaolin type clays, acid pretreatment is less significant although with some types of kaolin clays a mild acid pretreatment will also be found beneficial. The preliminary acid treatment may be effected by known processes such as are employed in the art for "acid activation" in the manufacture of decolorizing clays. For instance, the acid treatment may be carried out on the clay in finely divided form while the clay is suspended in water as in the nature of a slurry, to which a concentrated acid such as hydrochloric or sulfuric is added, or dilute acid may be added directly to the finely divided clay. The acid pretreatment, particularly in the case of kaolin clays need not be as severe as usually employed in activation of bentonites, which usually requires in the order of about 30% to 40% acid to dry clay. It is preferred to heat the mixture of clay and acid to about 160° to 210° F. for a period of two to twelve hours, followed by water washing and filtering. If desired, the clay may at this point be washed free of acid ions with accompanying extraction of substantially all soluble metal salts. The acid treated clay with or without purification by washing may then be dried in any known or desired manner. A milder acid pretreatment than that described above will be sufficient to open pores in the clay, allowing easy access of the gas or vapor used in the process described herein.

Although in certain known processes of hydrocarbon conversion the catalyst can be employed in the form of finely divided particles or powders suspended in the charge stock, in other procedures as in fixed or moving catalyst bed operation, the catalyst is advantageously employed in the form of larger aggregates or agglomerated masses such as pellets, tablets, coarse granules, or the like. The present invention in its specific aspect is more particularly concerned with such larger aggregates, which preferably are formed immediately subsequent to the preliminary acid treatment, if practiced. These larger masses may be formed by compressing the dry finely divided particles or powders in a pelleting machine or by previously wetting the dry, treated or untreated clay with water or other inert liquid that will bind the small particles or powder into a cake which, after drying, can be broken up into granules or fragments of desired sizes, or the wet mix can be formed into more regular shapes by molding including casting, extruding or the like. The pellets or granules or other aggregates formed should be of a size that can be efficiently employed in catalytic processes. If the catalyst is to be employed in hydrocarbon treating processes in the form of finer particles or powders, larger masses formed and treated in accordance with the above-described procedure can be subsequently ground or comminuted to the required fineness.

Since the high temperature treatment with gas or vapor destroys the plasticity of the clay, it is important that the same be treated substantially in the form in which it is to be employed as a catalyst. If the clay were initially treated in finely divided form, it would not possess sufficient cohesiveness to be readily amenable to the formation of larger aggregate masses such as by extrusion or molding, nor would the clay form a cohesive cake that could be broken up into pieces of desired size without crumbling.

The pelleted or otherwise formed particles of the clay to be substantially freed from iron are treated with the gas or vapor other than chlorine, particularly with sulfiding means, for instance as described in U. S. P. 2,466,046–2,466,048 and 2,466,052, at a temperature of at least 1200° F. but insufficient to effect substantial incipient fusion of the clay, thus to transform the iron of the clay in such a manner that it can be further transformed into ferric chloride by subsequent treatment of the clay with ammonium chloride, or the clay can be subjected for the same purpose under certain conditions to a mere heat treatment at a temperature of about 1600–1700° F. The latter procedure is particularly possible with kaolin type clays, while montmorillonite clays should generally not be heated to temperatures higher than about 1500–1550° F. More exact temperature ranges cannot be set out, since clays will vary in composition and properties including fusion temperature even when obtained from the same source.

The amount of the sulfiding or other treating gas or vapor, such as hydrogen sulfide, carbon disulfide, or the like, should be at least sufficient to chemically combine with all the iron present in the clay. Preferably a substantial excess of said treating gas or vapor is employed, say at least double the amount theoretically required for transforming the entire iron of the clay.

The ammonium chloride employed for transforming the iron compounds of the clay into iron chloride may be used either in vapor form, preferably mixed with an inert carrier gas or vapor, such as nitrogen, or as a solution in water or the like. The concentration of this solution, just as the concentration of a vaporous mixture of ammonium chloride and a carrier gas or vapor, is arbitrary, it being only important in this respect that the total amount of ammonium chloride present in the clay under reaction conditions is great enough to transform the total quantity of iron compounds of the clay into ferric chloride. Preferably a substantial excess of ammonium chloride, too, e. g., at least double the amount theoretically required for this purpose, is added to the clay under treatment.

If an aqueous solution of ammonium chloride is employed, this solution is added to the pelleted or otherwise formed clay, treated in the manner described before, at room temperature or slightly increased temperature by dipping the formed clay particles into said solution or immersing them therein for a period of time to impregnate said particles with said solution.

If the ammonium chloride is employed in vapor form, alone or mixed with a carrier gas or vapor, the treatment of the iron-containing clay is carried out at elevated temperature.

Solid ammonium chloride can also be employed. In the case of treating pelleted or otherwise shaped clay, crystals or powder of ammonium chloride are mixed with the clay particles sulfided or otherwise treated before. The resulting mixture is then gradually heated to vaporize the ammonium chloride, so that the vapors thereof will thoroughly penetrate into and through the single particles of the clay pellets or the like and a very intimate mixture is obtained. On further heating the mixture to reaction temperature, the ammonium chloride vapors react with the iron compounds of the clay, and iron chloride is thus produced.

The transformation of the iron of the pre-treated clays by ammonium chloride into iron chloride takes place at elevated temperatures, particularly at temperatures in the range of 300–1000° F. Thus, the pelleted or otherwise shaped pretreated clay is heated in the presence of the ammonium chloride to such temperature range and maintained at such temperature until substantially the total or most of the iron has reacted with the ammonium chloride vapors and has been transformed thereby into ferric chloride. In the case of treating the formed or unformed clay particles with ammonium chloride in vaporous form, the introduction of the vapor or the mixture thereof with inert gas or vapor is preferably effected under reaction conditions, i. e., at a temperature in the above-named range. The ammonium chloride vapor employed may, for this purpose, either be heated to said reaction temperature before the introduction into the clay material, or this material is preliminarily heated to reaction temperature and the ammonium chloride is introduced into the heated material, or both. The introduction of the vapor or vapor-gas mixture under these conditions is to be carried out for a period of time sufficient for the introduction of a substantial excess of ammonium chloride and until all or most of the iron compounds of the clay are transformed into chloride.

After completing the chloriding operation, the ferric chloride formed, together with other volatile or volatilizable compounds simultaneously formed and not removed during the reaction, together with any unchanged excess of ammonium chloride present, is removed by purging the treated clay with air or an inert gas or vapor at elevated temperatures, preferably at about 800–1000° F. Temperatures substantially higher than 1000° F. are suitably avoided as well during the chloriding operation as during the purging, since otherwise ferric chloride may be reduced, at least in part, to ferrous chloride by the hydrogen of the decomposing ammonium ion of the ammonium chloride or ammonium sulfide present. Since ferrous chloride has a melting point far higher than that of ferric chloride (1238–1245° F. against 540° F.) and sublimes at such temperature directly from the solid state, the evaporating temperature of the ferrous chloride is too high to allow its removal by purging with hot inert gases without endangering the catalytic properties of the clay. Therefore, conditions conducive to the formation of the ferrous salts should be avoided.

If necessary or desired, the iron-free clay may be calcined under known conditions to further adjust activity, improve the physical properties or the like.

While the original iron content of natural clays, such as those of the kaolinite type, varies considerably and generally amounts to from about 0.5% to 5% and more, it is possible by the present process to reduce this iron content, including that part thereof which cannot be removed by conventional acid treatment, very considerably, a reduction of iron calculated as $Fe_2O_3$ by weight on clay product (dry basis) to about 0.4% $Fe_2O_3$ being easily obtained, whereby marked improvement in the catalytic properties of the clay is effected. Catalysts of still lower iron content are readily obtainable by this method, for instance such having less than about 0.3% $Fe_2O_3$, and preferably those having a content of iron compounds corresponding to less than 0.2% $Fe_2O_3$. Thus, it is possible by the present process to remove substantially all or at least the greatest part of the iron of the clay, in contrast to a mere acid treatment of the clay, while the aluminum content of the clay, which is important for its catalytic activity, remains practically unchanged or is only slightly reduced by the process according to the invention.

It has further been found, in accordance with copending U. S. patent application Serial No. 444,638, filed of even date herewith, that plastic kaolin particles of an average size of two microns and less are particularly efficient as hydrocarbon conversion catalysts. It has been ascertained that the iron content of such small size particles of kaolin-type clays is relatively higher than that of coarser particles. While kaolin-type clays of a particle size of no more than two microns have proved to be very effective as catalysts without removal of iron therefrom, it has been ascertained that such catalysts can be substantially improved by removal of iron in accordance with the process of the present invention. While the iron removal treatment may be effected before the clay is assorted as to particle size, it is more convenient preliminarily to remove from the raw clay the major part of particles of a size greater than two microns and to retain only those which at least to a major part are of a size of two microns and less. This can be achieved by settling, sedimentation, centrifuging, or dispersion of the clay particles in a gas with subsequent separation by cyclones. Thereafter, the thus separated small-particle sized clay is subjected to the sulfiding treatment or the like in accordance with the present process and to the subsequent treatment with ammonium chloride. Here, too, the clay during such treatment can either be in the form of a very fine powder, or the small-sized particles of kaolin may be pelleted or otherwise conglomerated and then treated for removing the iron.

It has proved to be advantageous, in accordance with copending U. S. patent application Serial No. 444,636, filed of even date herewith, under certain conditions to obtain greater porosity or the like to admix the clay particles to be substantially freed from iron with a material removable during the heat treatment, particularly that following or combined with the treatment of ammonium chloride. Wood flour is preferred for this purpose, but other combustible organic materials are also useful, such as petroleum coke or the like, or mixtures of several such materials. The admixture is made before the pelleting or otherwise shaping of the clay under treatment. Apart from higher porosity of the shaped clay particles which allows easier and more thorough removal of the iron compounds from the clay, it has been found that the pellets or the like after the treatment and burning of the wood flour or other admixture are harder, have greater mechanical strength and higher catalytic activity than clays treated in a corresponding manner without admixture of combustible organic material. Such an admixture is particularly useful in the treatment of kaolin-type clays and, also, may be used with advantage in the treatment of this type of clays having a particle size of 2 microns or less.

*Example I*

A montmorillonite clay is activated by treatment of an aqueous slurry of the finely divided clay powder with sulfuric acid of 15% strength at room temperature over a period of eight hours, employing an amount of acid (100% basis) equal to 60% of the dried clay, then washed with water, and dried. The activated clay is formed into pellets of about 4 mm. cross-section by wetting the dry treated clay with water to form the small clay particles into a cake or thick paste which is extruded and cut into cylindrical pellets of desired size. The resulting shaped activated clay is dried and then treated at a temperature of about 1500° F. for a period of about two hours with a nitrogen-hydrogen sulfide mixture containing about 25% of $H_2S$ to transform the iron of the clay into $Fe_2S_3$. At least double the amount of hydrogen sulfide theoretically required for transforming all the iron present into ferric sulfide is introduced. After purging the treated clay for removal of excess hydrogen sulfide, it is subjected to a heat treat at 850° F. for 2 hours in the presence of flowing air and then treated with a mixture of ammonium chloride vapor and an inert gas, such as nitrogen, at a temperature of about 850° F. for about two hours. The vapor pressure of the $NH_4Cl$ is maintained at about 300 mm. (Hg) and the velocity of flow of the vapor-gas mixture is about 5 liters per minute per liter of catalyst being treated. Thereupon, the treated clay is purged at a temperature of about 950° F. by nitrogen to remove the ferric chloride formed by the preceding ammonium chloride treatment, together with excess of ammonium chloride still present and the ammonia formed by the reaction between the ferric oxide and the ammonium chloride and not yet vented. The catalyst thus obtained, after calcining at a temperature of about 1500° F., on analysis shows an iron content of 0.1% of $Fe_2O_3$, while the raw clay before the treatment had a content of 1.5% by weight of $Fe_2O_3$.

*Example II*

An Edgar plastic kaolin clay containing 0.73% by weight of iron compounds calculated as $Fe_2O_3$ is pelleted as described in Example I. The pellets are subjected to a treatment with a mixture of hydrogen sulfide and nitrogen as indicated there. The sulfided kaolin pellets are treated at a temperature of about 850° F. in an air stream for 2 hours and then with an excess of ammonium chloride vaporized in a flowing stream of nitrogen in a separate vessel and transferred therefrom to the vessel containing the kaolin pellets by direct flow of the mixture through the catalyst bed for about 2 hours at a pressure of 600 mm. (Hg) ammonium chloride and 160 mm. (Hg) nitrogen. The thus chlorided pellets are purged subsequently as described in Example I. The resulting product on analysis showed an iron content (on $Fe_2O_3$ basis) of 0.23% by weight, and for selected pellets of 0.16% by weight.

*Example III*

Kaolin-type iron-containing clay is pelleted into larger particles or granules of the order retained on a 25-mesh screen. The pellets are sulfided and oxidized in the manner described in Example I and are then dipped in an about 20% aqueous ammonium chloride solution and partially dried. Thereafter, the material is heat treated at about 750° F. for three hours in a stream of 100% nitrogen. Residual iron in the treated pellets was less than 0.25% by weight $Fe_2O_3$.

*Example IV*

An Edgar kaolin-type clay is mixed with 10% by weight of wood flour, pelleted and further treated in the manner indicated in Example III. The amount of ammonium chloride solution absorbed by the kaolin-wood flour mixture was about 34.5% by weight. An excess of ammonium chloride of about five times the amount theoretically required for transforming the iron compounds present into ferric chloride is present. The residual iron in the thus treated pellets was less than 0.25% by weight $Fe_2O_3$.

*Example V*

A kaolin-type iron-containing clay formed into pellets is treated with hydrogen sulfide in the manner described above. This treatment is followed by air oxidation at 850° F. for two hours. The pellets are thereafter mixed with solid crystals of ammonium chloride in an amount equivalent to about 5 times the weight of the iron present in the clay. The resulting mixture is gradually heated to 550° to 650° F. and maintained at such temperature for one hour. During the gradual heating, the ammonium chloride crystals melt and the compound evaporates. Its vapors penetrate into and intimately mix with the kaolin, so that the iron content thereof at reaction temperature will be substantially completely transformed into ferric chloride. Thereafter, the temperature is raised to about 850° F., and the material is purged at this temperature range by a stream of nitrogen for two hours. The residual iron in the thus treated clay is less than 0.3% by weight $Fe_2O_3$.

Obviously, many modifications and variations of the invention as hereinbefore set forth may be made without departing from the spirit and scope thereof, and, therefore, only such limitations should be imposed as are indicated in the appended claims.

What is claimed is:

1. In a method of preparing catalytic contact masses from clay containing iron compounds and heat treated for transforming the iron compounds into an easily removable condition, the steps of treating said heat treated clay with ammonium chloride and heating said clay in the presence of said ammonium chloride to a temperature sufficient to transform said iron compounds into ferric chloride but insufficient to develop substantial amounts of free hydrogen by decomposition of said ammonium chloride, and subsequently purging the treated clay by an inert gaseous medium at an elevated temperature sufficiently high to volatilize ferric chloride but not high enough to decompose ammonium compounds present with development of substantial amounts of free hydrogen.

2. The method of preparing catalysts from clay containing iron compounds, which comprises treating such a clay at a temperature of at least about 1200° F. and insufficient to effect substantial incipient fusion of the clay, with hydrogen sulfide, thereafter treating the clay with air, treating the resulting clay product with ammonium chloride and heating said product in the presence of said ammonium chloride to a temperature sufficient to effect transformation of said iron compounds into ferric chloride but insufficient to decompose substantial portions of the ammonium radical of said ammonium chloride with development of free hydrogen, and purging said ammonium chloride treated clay containing said ferric chloride with an inert material in gaseous form at an elevated temperature high enough to evaporate said ferric chloride under the conditions of treatment, but insufficient to decompose the ammonium radical.

3. The method in accordance with claim 1, wherein an amount of ammonium chloride is used substantially in excess of that theoretically required for transforming the total iron content of said clay under treatment into ferric chloride.

4. The method in accordance with claim 1, employed in the treatment of a kaolin-type iron-containing clay at least a major portion of which is composed of particles of a size not exceeding two microns.

5. The method in accordance with claim 1, employed in the treatment of an iron-containing clay in admixture with a substantial amount of combustible organic inert material.

6. The method in accordance with claim 1, wherein said heat treatment in the presence of ammonium chloride is carried out for a period of about two hours.

7. The process in accordance with claim 2, wherein a montmorillonite-type clay containing iron compounds and activated by acid treatment is subjected to the treatment claimed.

8. The process in accordance with claim 2, wherein a kaolin-type clay is subjected to the treatment claimed.

9. The process in accordance with claim 2, wherein a temperature in the range of about 300° to about 1000° F. is used during the treatment of the clay with ammonium chloride and at temperature in the range of about 800° to about 1000° F. is used in said purging operation.

10. The method in accordance with claim 2, wherein a mixture of ammonium chloride in vapor form and an inert gaseous medium is used for treating said resulting clay product to effect transformation of said compounds into ferric chloride.

11. The method in accordance with claim 2, wherein pre-formed pellets of iron-containing clay are subjected to the treatment claimed.

12. The method in accordance with claim 3, wherein the amount of ammonium chloride used is at least about 100% greater than that theoretically required.

13. The method in accordance with claim 11, wherein said heat treated iron-containing pre-formed clay is impregnated with an aqueous solution of ammonium chloride, whereupon said impregnated pre-formed pellets of clay are subjected to said heat treatment for transforming said iron compounds of the clay into ferric chloride.

14. The method of preparing catalysts from clay containing iron compounds, which comprises treating such a clay at a temperature of at least about 1200° F. and insufficient to effect substantial incipient fusion of the clay with hydrogen sulfide, converting the iron in said clay to iron sulfide, subsequently treating the iron sulfide containing clay at oxidizing conditions and converting the iron sulfide to ferric oxide, thereafter treating the resultant clay product with ammonium chloride in an amount at least double the amount theoretically required to convert the ferric oxide to ferric chloride, said treatment with ammonium chloride being at temperature in the range of 300° F. to 1000° F., converting said ferric oxide to ferric chloride, volatilizing and removing from the clay said formed ferric chloride, and recovering a clay product substantially free of iron.

15. The method of preparing substantially iron-free clay catalysts, comprising converting isomorphous iron in such a clay to iron sulfide by treatment with hydrogen sulfide above 1200° F., oxidizing the iron sulfide to iron oxide by treatment with air, subsequently reacting said iron oxide with ammonium chloride at a temperature in the range of 300° F. to 1000° F. and effecting formation of ferric chloride, volatilizing and removing said ferric chloride from said clay, and recovering a substantially iron-free clay catalyst product.

References Cited in the file of this patent

UNITED STATES PATENTS

| | | |
|---|---|---|
| 2,466,047 | Shabaker et al. | Apr. 5, 1949 |
| 2,504,357 | Swallen | Apr. 18, 1950 |
| 2,576,653 | Thomas | Nov. 27, 1951 |